United States Patent
Trifilio

[19]

[11] Patent Number: 6,086,035
[45] Date of Patent: Jul. 11, 2000

[54] WALL ANCHOR FOR USE WITH WIRE SHELVES

[75] Inventor: Christian R. Trifilio, Maineville, Ohio

[73] Assignee: Schulte Corporation, Cincinnati, Ohio

[21] Appl. No.: 09/130,966

[22] Filed: Aug. 7, 1998

[51] Int. Cl.$^7$ ................................................ F16B 45/00
[52] U.S. Cl. .................... 248/305; 248/231.91; 248/249; 52/698; 211/90.03; 411/34
[58] Field of Search ............... 248/305, 231.91, 248/231.9, 251, 249; 52/698; 411/38, 36, 34, 37, 55, 59, 60.2; 211/90.03

[56] References Cited

U.S. PATENT DOCUMENTS

| | | |
|---|---|---|
| 322,555 | 12/1885 | Kokenge et al. . |
| 1,307,318 | 6/1919 | Raeger .................................... 411/60.2 |
| 1,907,495 | 10/1933 | Brunski . |
| 3,381,566 | 5/1968 | Passer ....................................... 411/36 |
| 3,431,813 | 3/1969 | Johnson . |
| 3,911,516 | 10/1975 | Einhorn . |
| 3,937,122 | 2/1976 | Reidel . |
| 3,995,821 | 12/1976 | Einhorn . |
| 4,185,536 | 1/1980 | Fischer ....................................... 85/83 |
| 4,340,330 | 7/1982 | Reidel . |
| 4,601,625 | 7/1986 | Ernst et al. . |
| 4,708,552 | 11/1987 | Bustos et al. . |
| 4,763,456 | 8/1988 | Giannuzzi . |
| 4,861,206 | 8/1989 | Riedel . |
| 4,892,429 | 1/1990 | Giannnuzzi . |
| 5,039,262 | 8/1991 | Giannuzzi . |
| 5,160,225 | 11/1992 | Chern . |
| 5,188,496 | 2/1993 | Giannuzzi . |
| 5,190,425 | 3/1993 | Wieder et al. . |
| 5,211,512 | 5/1993 | Frischmann et al. ................. 405/259.4 |
| 5,224,805 | 7/1993 | Moretti et al. . |
| 5,234,299 | 8/1993 | Giannuzzi . |
| 5,267,423 | 12/1993 | Giannuzzi . |
| 5,288,189 | 2/1994 | Hwepworth ............................... 411/32 |
| 5,308,203 | 5/1994 | McSherry et al. . |
| 5,593,261 | 1/1997 | Giannuzzi et al. ....................... 411/55 |
| 5,626,245 | 5/1997 | Kokenge et al. . |
| 5,690,455 | 11/1997 | Fischer et al. ............................ 411/55 |

OTHER PUBLICATIONS

Master Suite—Closet Maid, *Storage Solutions for the Way You Live*, 1998.
TOX Anchor Technology, *TRI All–Purpose Plug, Standard Plugs*, pp. 8 and 9.
TOX Internet Website, URL http://www.bau–markt.de/tox/katalog/standard–tri.him, Printed Jul. 31, 1998, p. 1.
TOX Internet Website, URL http://www.bau–markt.de/tox/katalog/standard–4as.htm, Printed Jul. 31, 1998, pp. 1–2.
TOX Internet Website, URL http://www.bau–markt.de/tox/ratgeber/halten duebel.htm, Printed Jul. 31, 1998, pp. 1–3.
TOX Internet Website, URL http://www.bau–markt.de/tox/katalog/standard–tri.htm, Printed Jul. 31, 1998 pp. 1–2.

*Primary Examiner*—Ramon O. Ramirez
*Assistant Examiner*—Walter Landry
*Attorney, Agent, or Firm*—Dinsmore & Shohl LLP

[57] ABSTRACT

An anchor for securing a shelf having one or more wires to a wall is provided. The anchor has an elongate body and a head. The head has first and second grooves for receiving a wire of the shelf, wherein the first groove has an opening for receiving the wire in a direction substantially transverse to the longitudinal axis of the body and the second groove has an opening for receiving a wire of the shelf in a direction substantially parallel to the longitudinal axis of the body.

18 Claims, 7 Drawing Sheets

WALL ANCHOR FOR USE WITH WIRE SHELVES

TECHNICAL FIELD OF THE INVENTION

The present invention relates to an anchor for securing wire shelving to a wall, and, more particularly, to an anchor having more than one mounting position.

BACKGROUND OF THE INVENTION

The use of wire shelving has become a viable, low-cost alternative to traditional wood shelving. This wire shelving generally consists of a number of parallel-spaced, transversely-extending, cold drawn steel wires welded to one or more longitudinally extending support wires. The shelving can be provided in a wide variety of lengths, widths and styles, and is typically secured to the adjacent support walls by means of a number of well-known mounting devices or fasteners.

Figure 1:
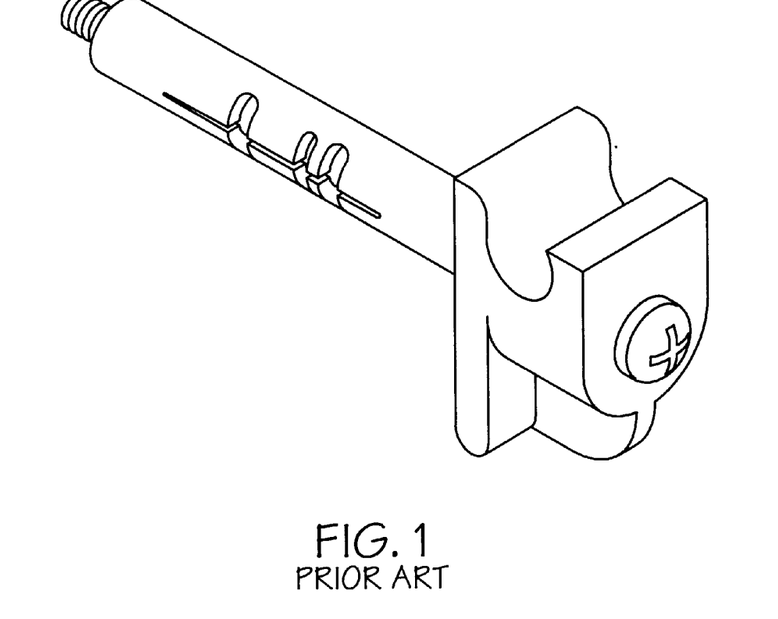
FIG. 1 is a perspective view of a prior anchor having a single groove for engaging a wire of a shelf.
Figure 2:
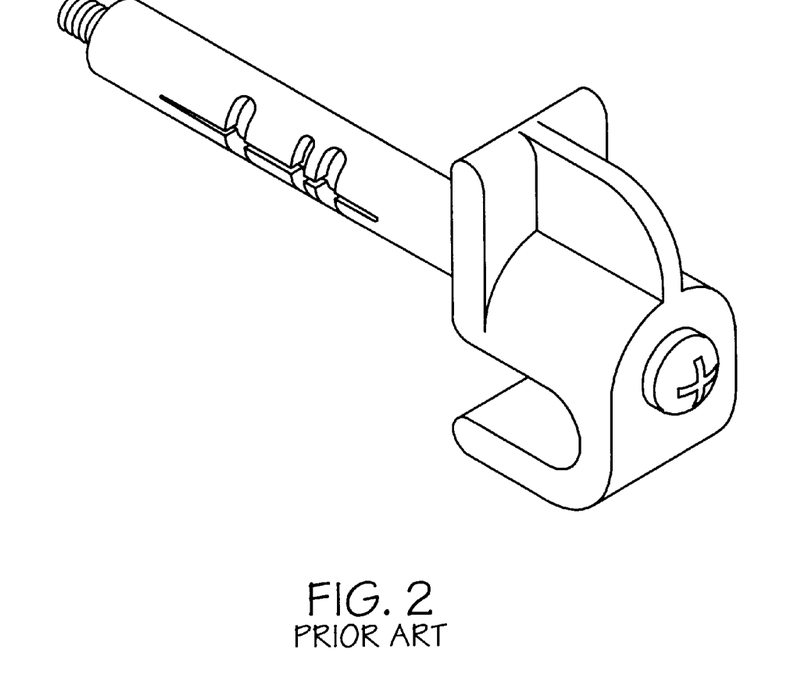
FIG. 2 is a perspective view of another prior anchor having a single groove for engaging a wire of a shelf.

One important consideration in the design of wire shelving is the ease of installation. Since such shelving may often be installed by relatively unskilled homeowners, or by building contractors desiring to cut installation time as much as possible, the mounting devices employed must be relatively simple and quick to install while providing easy alignment and positioning with respect to the wire shelving. FIGS. 1 and 2 illustrate prior wire shelving wall anchors for use with a hollow wall, wherein each anchor has a single groove for engaging the wire of a shelf and therefore accommodates only a single mounting position In addition, these prior anchors can be tiring to grip repeatedly because of the relatively small gripping area and sharp transitions between surfaces. As such, there exists a desire to provide an improved wall anchor which is more comfortable to grip and engage during the installation process and which provides improved versatility and flexibility with respect to securing a wire shelf to a wall. Particularly, there exists a desire for a single wall anchor suitable for use with either a hollow or solid wall and which can accommodate multiple mounting positions.

SUMMARY OF THE INVENTION

It is an object of the present invention to provide an anchor for securing a wire shelf to a wall which can accommodate more than one mounting position.

It is another object of the present invention to provide an anchor which is more comfortable to use.

It is a further object of the present invention to provide an anchor which allows more customized installation of wire shelving.

It is still a further object of the present invention to provide an anchor have increased surface area for gripping during use.

It is yet another object of the present invention to provide a single wall anchor which is suitable for use with either a hollow or solid wall and which can accommodate multiple mounting positions.

The foregoing objects can be accomplished by providing, in accordance with one aspect of the present invention, an anchor having an elongate body and a head. The head has first and second grooves for receiving a wire of a shelf, wherein the first groove has an opening for receiving the wire in a direction substantially transverse to the longitudinal axis of the elongate body, and the second groove comprises an opening for receiving the wire of the shelf in a direction substantially parallel to the longitudinal axis of the elongate body. The anchor can either support a wire shelf and its associated downward acting loads (as would be the case where the wire of the shelf engages the first groove) or which can prevent the upward movement of the wire shelf due to offset loads (as would be the case where the wire of the shelf engages the second groove).

The head further comprises a pair of bevels, each bevel being disposed on an opposite side of the head and adjacent the second groove. The head tapers inwardly toward the longitudinal axis of the body to form an edge. One or more rows of radially extending barbs are disposed adjacent slits in the body, wherein the barbs assist in securing the anchor to a wall. The barbs are preferably substantially polyhedral in shape and are angled toward the head.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE PREFERRED EMBODIMENTS

Reference will now be made in detail to the presently preferred embodiments of the invention, examples of which are illustrated in the accompanying drawings, wherein like numerals indicate the same elements throughout the views. As will be appreciated, the present invention is directed to an anchor for securing a wire shelf to a wall, and, in a preferred combination, can be used to secure a wire shelf to either a hollow or solid wall in one of two mounting positions. More preferably, the anchors of the present invention can be used with a substantially vertical wall of dry wall construction having a thickness of ½ inch or greater, such as that typically found in a home, or with a solid wall or a wood stud, such as that which often supports dry wall in a building. The anchors of the present invention are preferably made from a plastic, such as nylon, and, more preferably, are formed by injection molding or like.

Figure 3:
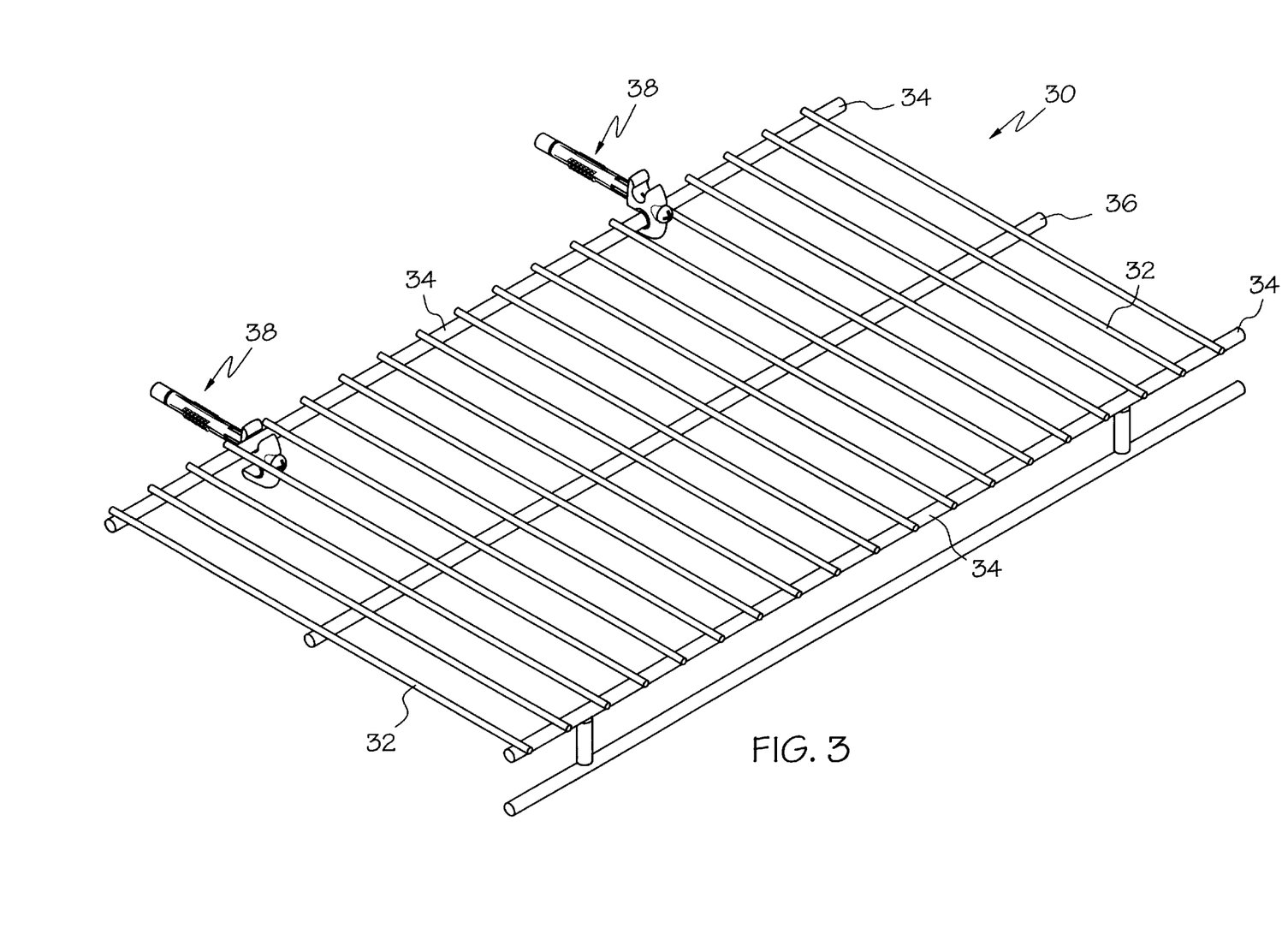
FIG. 3 is a perspective view of an exemplary shelving system comprising a wire shelf and two anchors, wherein the anchors are illustrated in two mounting positions.

An exemplary shelving system made in accordance with the present invention is illustrated in FIG. 3. The shelf 30 comprises a plurality of transversely-extending parallel-spaced wire members 32 which are supported by a plurality of somewhat larger, generally cylindrical, longitudinally extending support wires 34 which are disposed at the front and rear ends of the transversely extending wire members 32. Additional support wires, such as wire 36, can be provided along the undersurface of wire members 32 between the front and rear support wires 34. Exemplary anchors 38 made in accordance with the present invention are illustrated engaging the rearward longitudinally extending support wire 34, wherein the leftmost anchor 38 is illustrated in a first mounting position and the right-most anchor 38 is illustrated in a second mounting position. While the present invention will be described hereafter with respect to the exemplary wire shelf 30, it will be appreciated that other wire shelf configurations may be equally suited for use with the anchors of the present invention.

Figure 8:
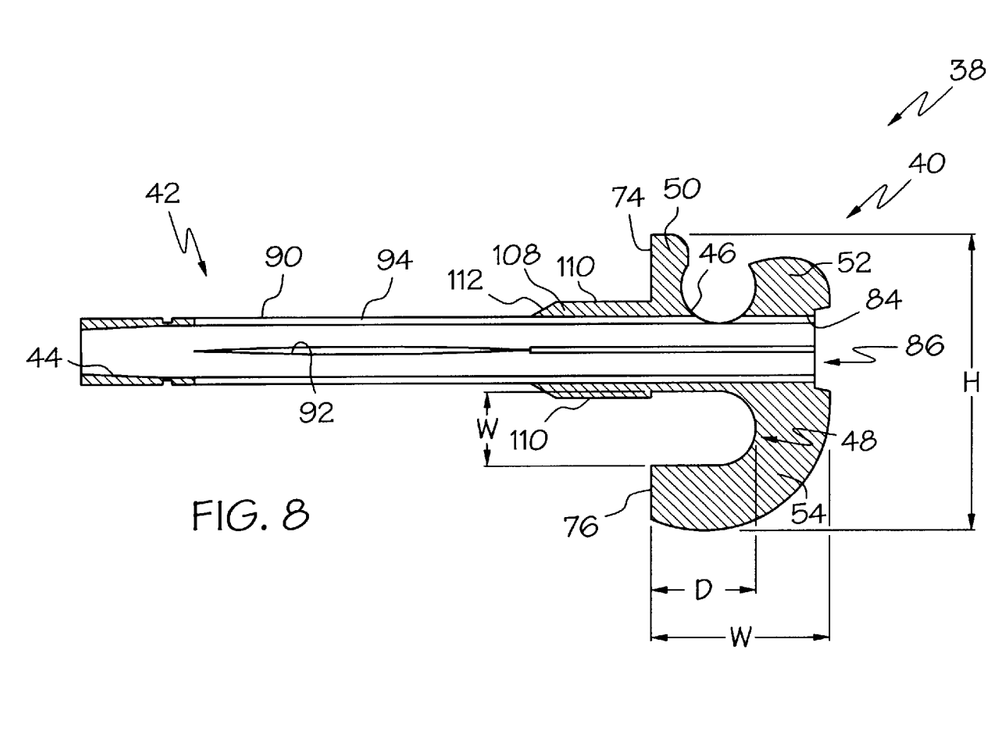
FIG. 8 is a cross-sectional side view of the anchor of FIG. 6 taken along line 8—8 thereof.

Referring to FIGS. 4 to 8, the preferred anchor 38 has a longitudinal axis L, a head 40 and an elongate body 42 which is attached to the head 40. A passage 44 extends through the head 40 and body 42, as best seen in FIG. 8. The passage 44 is sized to receive a threaded member, such as a machine or wood screw, and, more preferably, the passage 44 is sized to receive a ⅛ wood screw. The head 40 has a first groove 46 and a substantially U-shaped second groove 48, both grooves being sized to receive the rearward longitudinally-extending support wire 34 of the wire shelf 30, as shown in FIG. 3. The head 40 also comprises a first tip 50, a second tip 52, and a third tip 54. The second and third tips 52 and 54 have an edge 56 defining an apex of the tips. The second groove 48 has an opening 58 for slidably receiving the rearward longitudinally-extending support wire 34 of the wire shelf 30 in a substantially horizontal direction (i.e., in a direction substantially parallel to the longitudinal axis L). For ease of installation, the opening 58 preferably has a width W at least as wide as the diameter of the support wire 34 which it slidably engages and the depth D of the second groove 48 is about equal to twice the diameter of the support wire 34. In contrast, the first groove 46 has an opening 60 for receiving the rearward longitudinally-extending support wire 34 of the shelf 30 in a substantially vertical direction (i.e., in a direction substantially transverse to the longitudinal axis L), wherein the width W of the opening 60 is preferably less than the diameter of the support wire 34 so that the wire 34 must be "snapped" into the first groove 46 by outwardly expanding the first and second tips 50 and 52 of the head 40. After the support wire 34 is disposed within first groove 46, the tips 50 and 52 preferably return to their relaxed or nominal position such that an increased force is required to remove the support wire 34 from the first groove 46, because the tips 50 and 52 must be displaced away from each other in order to expand the opening 60 so that the support wire 34 can pass therethrough. Preferably, bevels 62 and 64 (best seen in FIGS. 4, 5 and 6) are located on first and second surfaces 66 and 68 of the head 40 adjacent to the bottom 70 and upper surface 72 of the second groove 48. During use, the bevels 62 and 64 provide a comfortable finger engagement with the head 40, thereby reducing finger stress which can be caused by repetitive anchor installation.

Figure 6:
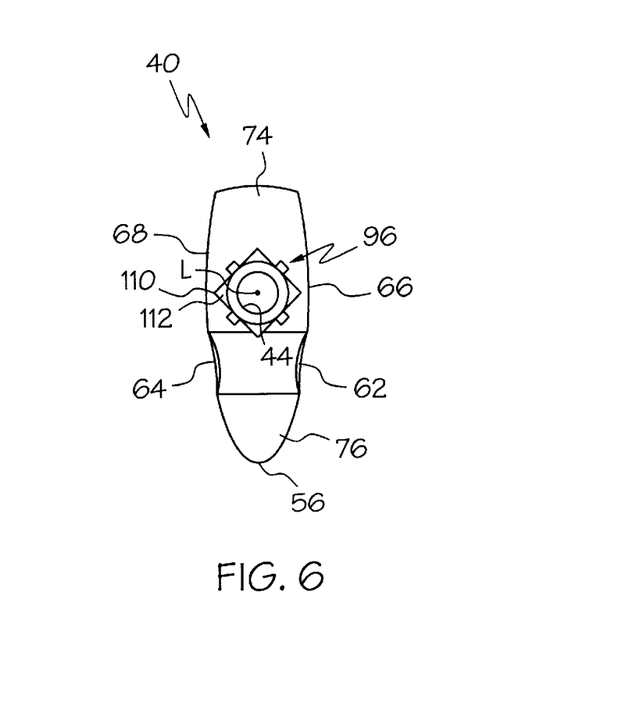
FIG. 6 is an end view of the anchor of FIG. 4.
Figure 7:
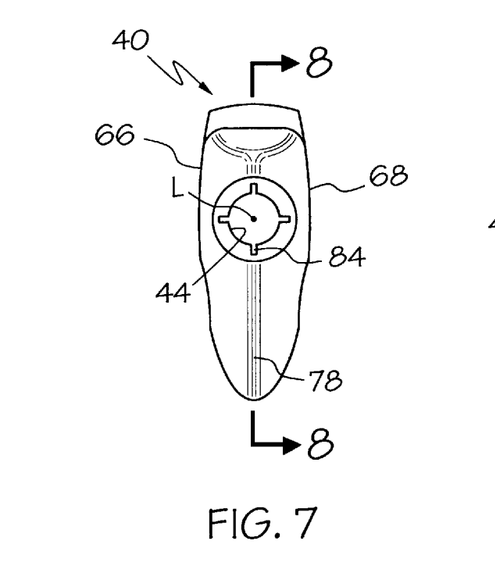
FIG. 7 is front view of the anchor of FIG. 4.

The head 40 has flat end surfaces 74 and 76 which are disposed transverse to the longitudinal axis L of the anchor 38 and which engage a wall during use. The flat end surfaces 74 and 76 resist rotation of the head 40 caused by installation forces or loads supported by the wire shelf 30. The first and second surfaces 66 and 68 taper inwardly toward the edge 56, thereby providing an improved shape which is easier to grip and pinch during use. In addition, the first and second surfaces 66 and 68 have an increased surface area, over the prior anchors of FIGS. 1 and 2, thereby providing a user of the anchor 38 with a more comfortable and positive finger engagement with the head 40. The flat end surface 76 is substantially triangular in shape, as best seen in FIG. 6, due to the taper toward the edge 56. More preferably, first and second surfaces 66 and 68 have a height H from between about 0.9 inches and about 1.1 inches and a width W of between about 0.3 inches and about 0.5 inches so that sufficient surface area is provided for gripping the head 40 during use.

Figure 5:
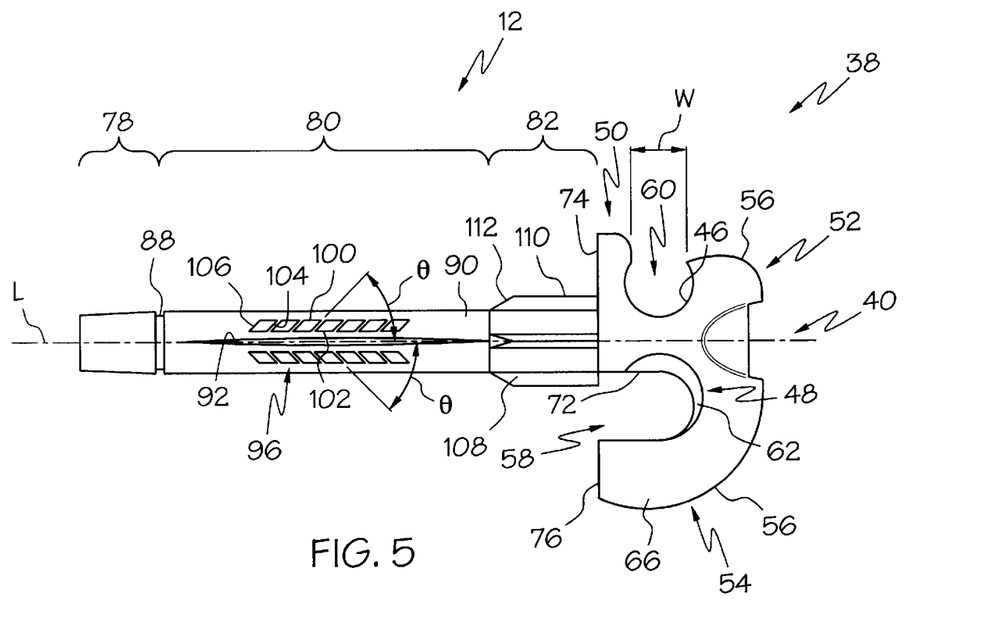
FIG. 5 is a side view of the anchor of FIG. 4.

As best seen in FIG. 5, the body 42 has a front portion 78, a middle portion 80, and an end portion 82, the end portion 82 preferably being integrally attached to the head 40. The passage 44 has a plurality of longitudinally extending grooves 84 (FIG. 8) which extend from a front opening 86 of the passage 44 through the head 40 and through the end portion 82 of the body 42. The grooves facilitate the molding of the anchor, as discussed more fully hereafter. The inner surface of the passage 44 which passes through the front portion 78 of the body 42 tapers inwardly towards the longitudinal axis L of the anchor 38, as shown in FIG. 8. This inward taper of the inner surface of the passage 44 interferes with the advancement of the threaded member through the passage 44 during use, thereby cutting threads in this portion of the inner surface. In other words, advancement of the threaded member through the first portion 78 creates a "nut" as the threads are cut by the threaded member. As the threaded member continues to rotate through the first portion 78, the first portion 78 will traverse along the longitudinal axis L of the anchor 38 toward the head 40 as the threaded member is rotated, thereby radially expanding the body 42, as discussed more fully hereafter.

Figure 11:
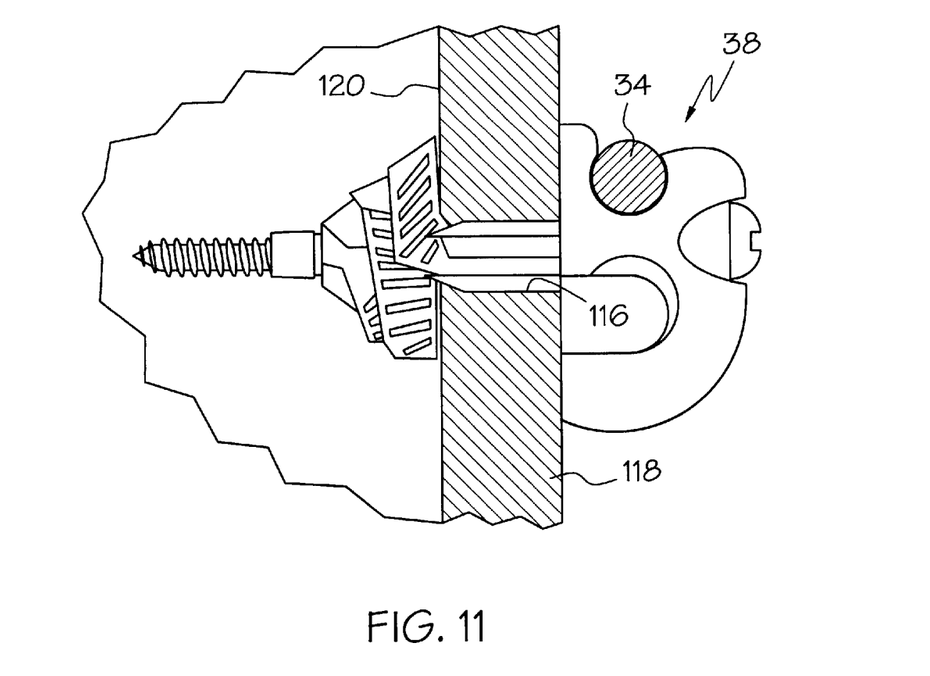
FIG. 11 is a partial cross-sectional view of the anchor of FIG. 4 and a wire shelf secured to a hollow wall.
Figure 12:
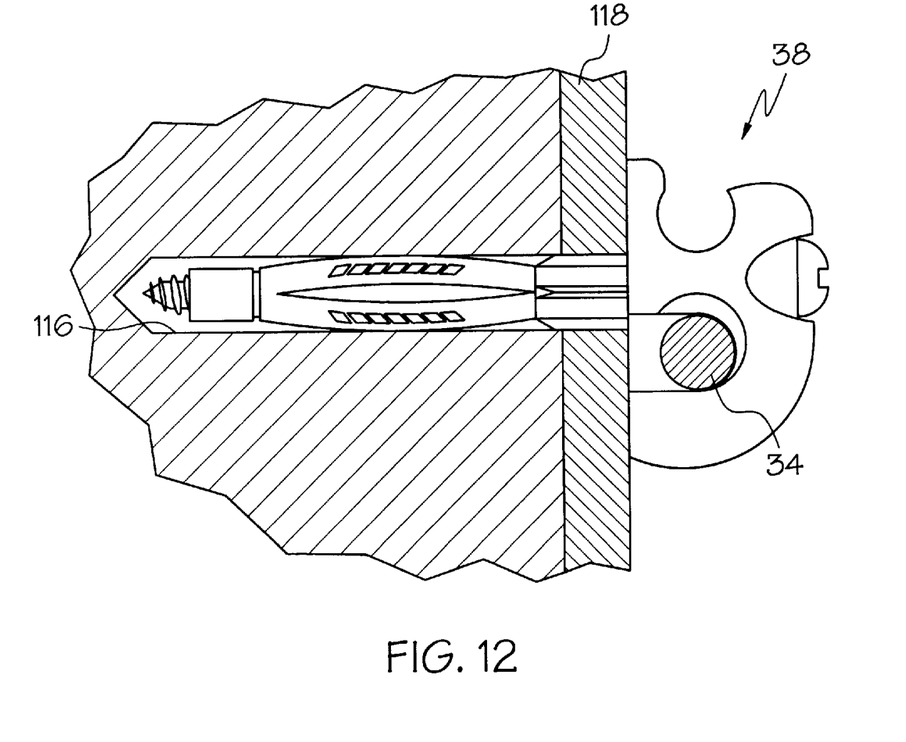
FIG. 12 is a partial cross-sectional side view of the anchor of FIG. 4 and a wire shelf secured to a solid wall.

The middle portion 80 of the body 42 preferably extends from the edge of the longitudinally extending grooves 84 to about a circumferentially disposed groove 88 which is located about the outer surface 90 of the body 42. Preferably, the middle portion 80 is about 1.2 inches in length and has one or more slits 92 which extend from the outer surface 90 through the body 92 to the passage 44. The slits 92 are preferably equispaced about the outer surface 90 of the middle portion 80 of the body 42, and, more preferably, each slit is substantially aligned with the longitudinally extending groove 84. Most preferably, the middle portion 80 comprises about 4 slits 92, wherein adjacent slits 92 define an arm 94 which expands radially during use to secure the anchor 38 to a wall, as shown in FIGS. 11 and 12.

Figure 4:
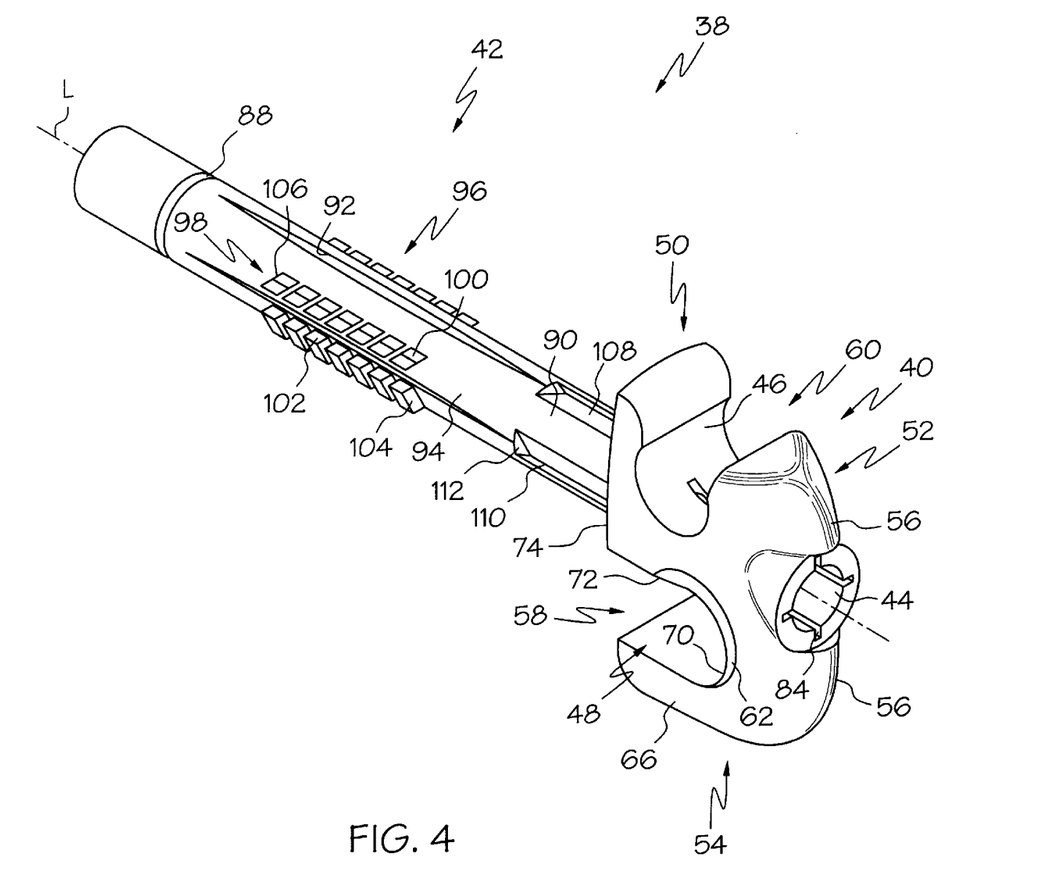
FIG. 4 is a perspective view of the preferred anchors illustrated in FIG. 3.

The outer surface 90 of the middle portion 80 also preferably comprises a plurality of radially projecting barbs 96 which are arranged in one or more rows 98 comprising about 7 barbs per row, wherein the rows 98 are aligned on either side of and adjacent to a slit 92. The barbs are substantially polyhedral in shape and are angled in a direction toward the head 40. More preferably, the barbs 96 are substantially cubic in shape, wherein first face 100 and second face 102 are substantially parallel to an edge of a slit 92 and third face 104 and fourth face 106 are angled forwardly in a direction toward the head 40, as best seen in FIGS. 4 and 5. In a preferred configuration, the third and fourth faces 104 and 106 are oriented at an angle θ of between about 30 degrees and about 50 degrees from the direction of the edge of a slit 92 so that the barbs can "grip" or engage the a solid wall or stud. Most preferably, the barbs 96 are disposed adjacent two of four oppositely disposed slits, as best seen in FIG. 4, such that two slits do not have barbs 96 disposed adjacent the edges of these slits.

A plurality of longitudinally extending ridges 108 are located about the outer surface 90 of the end portion 82 of the body 42. The ridges 108 are preferably three-sided polyhedrons having an apex 110 whose direction is substantially aligned with a slit 92. The ridges 108 extend from the head 40 to adjacent a slit 92. Each ridge 108 has a bevel 112 disposed at the terminus of the ridge. More particularly, the bevel 112 preferably extends from the outer surface 90 adjacent a slit 92 to the apex 110 of a ridge 108. The ridges 108 are equispaced about the outer surface 90 of the end portion 82 and are about 4 in number corresponding with the slits disposed about the body 42. The ridges 108 prevent rotation the anchor 38 during use (i.e., when the threaded member is advanced through the anchor 38) and also can minimize the deformation of the end portion 82 associated with radial expansion and "rossetting" of the arms 94 as the threaded member advances the first portion 78 toward the head 40 during installation. Particularly, the ridges 108 increase the torsional strength of the end portion 82, which, in turn, permits a decrease in the thickness of the body 42 while still maintaining the same structural strength.

The circumferential groove 88 between the middle portion 80 and the first portion 78 also aids in the "rossetting" of the arms 94 during use. As the arms 94 radially expand, the proximal end of an arm 94 (i.e., the portion adjacent the circumferential groove 88) tends to stretch at one corner and bulge at the opposite corner as the arm 96 twists about the longitudinal axis of the anchor 38. The circumferential groove 88 permits the arm 94 to more freely deform (e.g., bulge at the proximal end) so that less force is required to advance the threaded member and deform or twist the arms.

Figure 9:
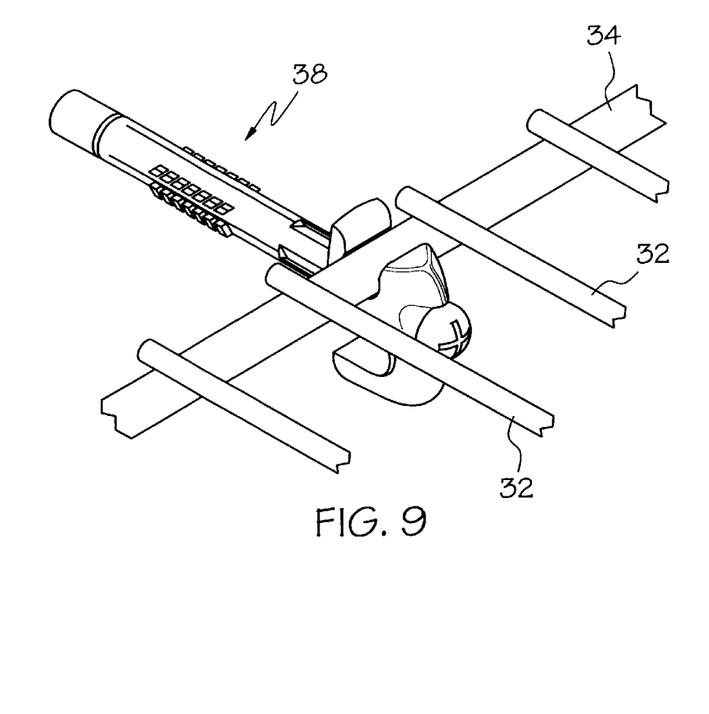
FIG. 9 is an enlarged partial perspective view of the leftmost anchor of FIG. 3.
Figure 10:
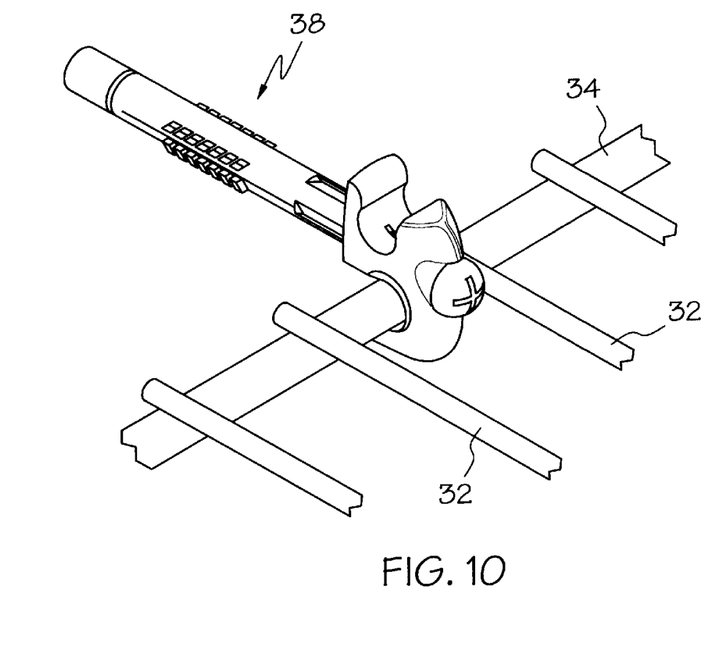
FIG. 10 is an enlarged partial perspective view of the rightmost anchor of FIG. 3.

A preferred method of using the exemplary anchor 38 will now be described. As seen in FIGS. 3, 9 and 10, the anchor 38 can be utilized in one of two mounting positions. The leftmost anchor 38 of FIG. 3 (which is shown in greater detail in FIG. 9) illustrates a first mounting position while the rightmost anchor 38 (illustrated in greater detail in FIG. 10) illustrates a second mounting position. In the first mounting position, the longitudinally-extending support wire 34 engages the first groove 46 of the head 40 of the anchor 38 while the rearward support wire 34 engages the second groove 48 of the head 40 of the anchor 38 in the second mounting position. The first mounting position is particularly adapted to support the wire shelf 30 and its associated load (e.g., clothes, etc.) while the second mounting position is particularly adapted to prevent the upward movement of an installed wire shelf (or rotation thereof about a point) due to offset loads or the like. In both instances, the threaded member and anchor body 42 will transfer the loads to the wall to which the anchor is secured. An anchor 38 utilizing the first mounting position is preferably installed in a wall prior to inserting the rearward support wire 34 into the first groove 46 while an anchor utilizing the second mounting position is preferably installed after the shelf 30 has been attached to a wall by simply sliding the support into the second groove 48.

Referring to FIGS. 11 and 12, the wire shelf 30 is installed by first drilling one or more holes 116 in a wall 118 at the location where anchors 38 in the first mounting position will be installed, wherein the holes have a diameter about equal to the diameter of the body 42. As will be appreciated, the diameter of the hole 116, however, should be less than the diameter of a circle enclosing the apexes 110 of the ridges 108, so that the ridges 108 can engage the wall 118 to prevent rotation of the anchor 38 as the threaded member is rotated. The anchor 38 is inserted into hole 118 and the threaded member is rotated to begin cutting the threads in the first portion 78 of the body of the anchor 38. As a user continues to rotate the threaded member, the first portion 78 will be advanced toward the head 40 of the anchor 38, thereby radially expanding the arms 94 of the body 42. If the anchor 38 is inserted into a solid wall or stud, the arms 94 will radially expand and engage the solid wall as generally shown in FIG. 12. The forward angle 0 of the barbs 96 helps prevent removal of the anchor 38 from the solid wall or stud, as the barbs 96 will tend to "grip" the inner surface of the hole 116 which they are engaging.

If the anchor 38 is inserted into a hollow wall, as shown in FIG. 1, rotation of the threaded member will cause the arms 94 to "rossette" as shown. In other words, the arms 94 will twist about the longitudinal axis of the anchor 38 as the first portion 78 is advanced toward the head 40 by rotation of the threaded member. The rossetting of the arms 94 secures the anchor 38 to the hollow wall 118. As the arms 94 twist about the longitudinal axis L of the anchor 38, the barbs 96 tend to interlock, thereby assisting in maintaining the arms 94 in a rossetted shape. In addition, the barbs 96 can engage the inner surface 120 of the hollow wall 118, thereby also aiding in securing the anchor 38 to the wall.

As will be appreciated, the anchor 38 provides improved versatility and ease of installation by providing two mounting positions so that customized installation of a wire shelf can be accommodated. Particularly, the first mounting position is suited for initially securing the wire shelf 30 to the wall 118 after the anchor 38 has been installed in the wall 118 by simply pressing the rearward support wire into the first groove 46 of the anchor 38. Additional anchors 38 can be installed after securing the wire shelf 30 to the wall 118 by drilling additional holes 116 at the desired support locations and installing the additional anchors 38 in the second mounting position by sliding the rearward support wire 34 into the second groove 48. In addition to versatility in mounting configurations, the head of the anchor 38 provides a comfortable and effective gripping surface during installation of the anchor in a solid or hollow wall.

A preferred method for forming the anchor 38 will now be described. In an injection molding process, a mold having a mold cavity whose shape approximates that of the anchor 38 and a molding pin having an outer shape approximating the passage 44 and grooves 84 can be used to form the anchor 38. Particularly, the molding pin is inserted into the mold cavity such that the molding pin will form the passage 44, grooves 84 and slits 94 upon hardening of the thermosetting plastic, such as nylon, which is introduced into the mold cavity to form the anchor 38. The mold pin and molded anchor can then be separated from the mold for further processing, as desired.

While the preferred anchor 38 has been described herein as comprising an elongate body 42 which is integrally connected to a head 40, it is contemplated that other configurations can be adopted. For example, the head 40 can be provided separately from the body 42 (i.e., the head 40 and body 42 constitute separate members and are not integrally connected). In addition, it is contemplated that the elongate body 42 and threaded member can be the same, similar to the anchor arrangement illustrated in FIG. 14 of U.S. Pat. No. 5,626,245 to Kokenge et al., which is hereby fully incorporated by reference herein. Particularly, the shank of the threaded member could pass through the head and have threads adapted to secure the head to either a solid or hollow wall.

Having and shown and described the preferred embodiments of the present invention, further adaptations of the wall anchor described herein can be accomplished by appropriate modification by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

What is claimed is:

1. An anchor for securing a shelf having one or more wires to a wall, said anchor comprising:
    an elongate body having a longitudinal axis and configured for securing said anchor to a wall; and
    a head attached to said body, said head having first and second grooves for receiving a wire of a shelf.

2. The anchor of claim 1, wherein said second groove is substantially U-shaped.

3. The anchor of claim 1, wherein said first groove is disposed above said longitudinal axis of said body.

4. The anchor of claim 3, wherein said second groove is disposed below said longitudinal axis of said body.

5. The anchor of claim 4, wherein said head further comprises a pair of bevels, wherein each of said bevels are positioned on opposite sides of said head adjacent said second groove.

6. The anchor of claim 5, wherein head tapers inwardly towards said longitudinal axis of the anchor to form an edge.

7. The anchor of claim 1, wherein said body is formed integrally with said head, and wherein said body is adapted to radially expand to secure the anchor to the wall during use.

8. The anchor of claim 7, wherein said body and said head have a passage extending therethrough for receiving a threaded member.

9. The anchor of claim 8, wherein said body further comprises a plurality of longitudinally extending slits.

10. The anchor of claim 9, wherein said body further comprises a one or more rows of radially extending barbs disposed adjacent said slits.

11. The anchor of claim 10, wherein each of said barbs is substantially polyhedral in shape and is angled toward said head.

12. The anchor of claim 9, wherein said head further comprises at least one substantially flat surface for engaging the wall during use, said flat surface being oriented substantially transverse to the longitudinal axis of the anchor, and wherein said body has a plurality of radially extending ridges disposed between said flat surface and said slits.

13. The anchor of claim 12, wherein each of said ridges is aligned substantially with one of said slits.

14. The anchor of claim 1, wherein said body is substantially cylindrical in shape and further comprises a groove disposed about the outer surface of said body in a circumferential direction.

15. A wall anchor for use with a wire shelf, said wall anchor comprising:
    a threaded member;
    an elongate body; and
    a head attached to said body; wherein said body and said head has a passage extending therethrough for receiving said threaded member, said head has first and second grooves for receiving a wire of a shelf;
    wherein said body is adapted to radially expand for securing the anchor to a wall during use.

16. A method for securing an anchor to a wall, comprising the steps of:
    providing an anchor comprising a threaded member, an elongate body, a head attached to said body, wherein said body and said head have a passage extending therethrough for receiving said threaded member, said head having a first groove for receiving a wire of a shelf in a direction substantially transverse to the longitudinal axis of the anchor and second groove for receiving a wire of a shelf in a direction substantially parallel to the longitudinal axis of the anchor;
    drilling a hole in a wall;
    selecting which groove will receive the wire of the shelf;
    inserting said elongate body into the hole;
    rotating said threaded member within the passage to radially expand said body, thereby securing said anchor to the wall; and
    inserting the wire of the shelf in said selected groove.

17. A shelving system, comprising:
    a wire shelf having a plurality of transversely-extending wires and a longitudinally-extending support wire disposed at the forward end of said transversely-extending wires and a longitudinally-extending support wire disposed at the rearward end of said transversely-extending wires; and
    one or more anchors for securing said wire shelf to a wall, said anchors comprising a head and an elongate body having a longitudinal axis, said head having a first groove and a second groove for receiving said rearward longitudinally-extending support wire.

18. The shelving system of claim 17, wherein said body is formed integrally with said head and said head and said body have a passage extending therethrough for receiving a threaded member.

* * * * *

UNITED STATES PATENT AND TRADEMARK OFFICE
CERTIFICATE OF CORRECTION

PATENT NO. : 6,086,035
DATED : July 11, 2000
INVENTOR(S) : Christian R. Trifilio It is certified that error appears in the above-identified patent and that said Letters Patent is hereby corrected as shown below:

Claim 1,
Line 6, replace "a wire of a shelf" with: --one or more wires of a shelf; wherein said first groove has an opening having a width which extends in a direction substantially parallel to said longitudinal axis of the anchor, and said second groove has an opening having a width which extends in a direction substantially transverse to said longitudinal axis of the anchor--.

Claim 15,
Line 8, replace "a wire of a shelf" with: --one or more wires of a shelf; wherein said first groove has an opening having a width which extends in a direction substantially parallel to said longitudinal axis of the anchor, and said second groove has an opening having a width which extends in a direction substantially transverse to said longitudinal axis of the anchor--.

Claim 16,
Line 1, replace "an anchor" with --a wire shelf--.
Line 2, after "the steps of" insert --providing a wire shelf comprising a plurality of wire members;--.
Line 7, cancel beginning with "a first groove for receiving" to and including "longitudinal axis of the anchor" in line 11, and insert the following: --first and second grooves for receiving one or more wires of a shelf, wherein said first groove has an opening having a width which extends in a direction substantially parallel to said longitudinal axis of the anchor, and said second groove has an opening having a width which extends in a direction substantially transverse to said longitudinal axis of the anchor--.

UNITED STATES PATENT AND TRADEMARK OFFICE
CERTIFICATE OF CORRECTION

PATENT NO.    : 6,086,035
DATED         : July 11, 2000
INVENTOR(S)   : Christian R. Trifilio It is certified that error appears in the above-identified patent and that said Letters Patent is hereby corrected as shown below:

Claim 16,
Line 13, replace the first instance of "the" with --a--.
Line 18, replace the first instance of "the" with --a--.

Claim 17,
Line 10, replace "a first groove and a second groove for receiving said rearward longitudinally-extending support wire" with: --first and second grooves for receiving one or more wires of said shelf, wherein said first groove has an opening having a width which extends in a direction substantially parallel to said longitudinal axis of the anchor, and said second groove has an opening having a width which extends in a direction substantially transverse to said longitudinal axis of the anchor--.

Signed and Sealed this

Fourteenth Day of August, 2001

*Attest:*

*Attesting Officer*

NICHOLAS P. GODICI
*Acting Director of the United States Patent and Trademark Office*